(12) United States Patent
Cuma

(10) Patent No.: US 7,140,657 B2
(45) Date of Patent: Nov. 28, 2006

(54) OPENABLE MOTOR VEHICLE REAR

(75) Inventor: Ismail Cuma, Munich (DE)

(73) Assignee: Webasto AG, Stockdorf (DE)

( * ) Notice: Subject to any disclaimer, the term of this patent is extended or adjusted under 35 U.S.C. 154(b) by 106 days.

(21) Appl. No.: 10/880,091

(22) Filed: Jun. 30, 2004

(65) Prior Publication Data
US 2005/0001442 A1    Jan. 6, 2005

(30) Foreign Application Priority Data
Jul. 2, 2003    (DE) ................ 103 29 992

(51) Int. Cl.
*B60P 3/34* (2006.01)
(52) U.S. Cl. .................. 296/26.1; 296/26.09
(58) Field of Classification Search ............. 296/26.09, 296/26.08, 26.1, 26.11
See application file for complete search history.

(56) References Cited
U.S. PATENT DOCUMENTS 4,620,743 A * 11/1986 Eke .................. 296/146.8
5,692,792 A * 12/1997 Klar (minor) ........... 296/26.02
5,997,072 A * 12/1999 Parkinson ............... 296/146.8
6,425,205 B1 * 7/2002 Wygle et al. ............. 49/349
6,485,094 B1   11/2002 Corder et al.

FOREIGN PATENT DOCUMENTS

DE        100 18 148 A1    10/2001

* cited by examiner

*Primary Examiner*—Joseph D. Pape
(74) *Attorney, Agent, or Firm*—David S. Safran

(57) ABSTRACT

An openable motor vehicle rear with a rear window which can be moved to clear a first cargo space opening, and with a rear hatch located below the rear window that can be moved to the rear beyond the contour of the vehicle, to thereby clear a second cargo space opening. In one embodiment of the present invention, a rear part is provided between the rear window and the rear hatch which covers the transition between the rear window and the rear hatch.

17 Claims, 9 Drawing Sheets

OPENABLE MOTOR VEHICLE REAR

BACKGROUND OF THE INVENTION

1. Field of the Invention

The invention relates to an openable vehicle rear.

2. Description of Related Art

One type of vehicle rear is disclosed in U.S. Pat. No. 6,485,094. This reference discloses a vehicle rear in which a rear window can be raised over a fixed roof part. In this way, an upper cargo space opening is cleared. Furthermore, the reference describes relative to FIGS. 18 and 19 that a rear hatch which adjoins the lower edge of the rear window can be lowered so that additional bottom cargo space opening is cleared. The top and the bottom cargo space openings jointly define a large cargo space for loading of bulky baggage items.

Published German Patent Application DE 100 18 148 A1 further discloses a vehicle with a cargo space which can be enlarged by extending a cargo space extension which is located in the rear.

SUMMARY OF THE INVENTION

A primary object of the invention is to provide an improved motor vehicle rear which makes available, variety of possible uses.

This object is achieved by an openable vehicle rear with a rear window which can be moved to clear a first cargo space opening, and with a rear hatch which is located underneath it and which can be moved to the rear beyond the contour of the vehicle when closed to clear a second cargo space opening, wherein between the rear window and the rear hatch, there is a rear part which covers the transition between the two.

Because the transition area between the rear window and the rear hatch is covered by a rear part, a separate opening of the top cargo space opening and the bottom cargo space opening is made possible, in addition to their joint opening.

In one advantageous execution, the rear part is supported to be able to move, preferably to pivot, on the rear hatch. In this manner, the seal along the bottom edge of the rear window is improved. In addition, the rear part can be used at the same time as an actuating and/or locking element for the rear hatch.

The rear hatch may be preferably implemented as a component of a cargo space extension which can be moved out of the cargo space to the rear.

Preferably, the rear part can be actuated by a motor. Likewise, the rear hatch can preferably be actuated by a motor. In one especially advantageous embodiment, the rear hatch and the rear part are actuated by a common drive.

Another additional use of the rear part in another embodiment is to accommodate the cargo space cover which may be preferably implemented as a retractable shade.

These and other advantages and features of the present invention will become more apparent from the following detailed description of the preferred embodiments of the present invention when viewed in conjunction with the accompanying drawings.

DETAILED DESCRIPTION OF THE INVENTION

Figure 1:
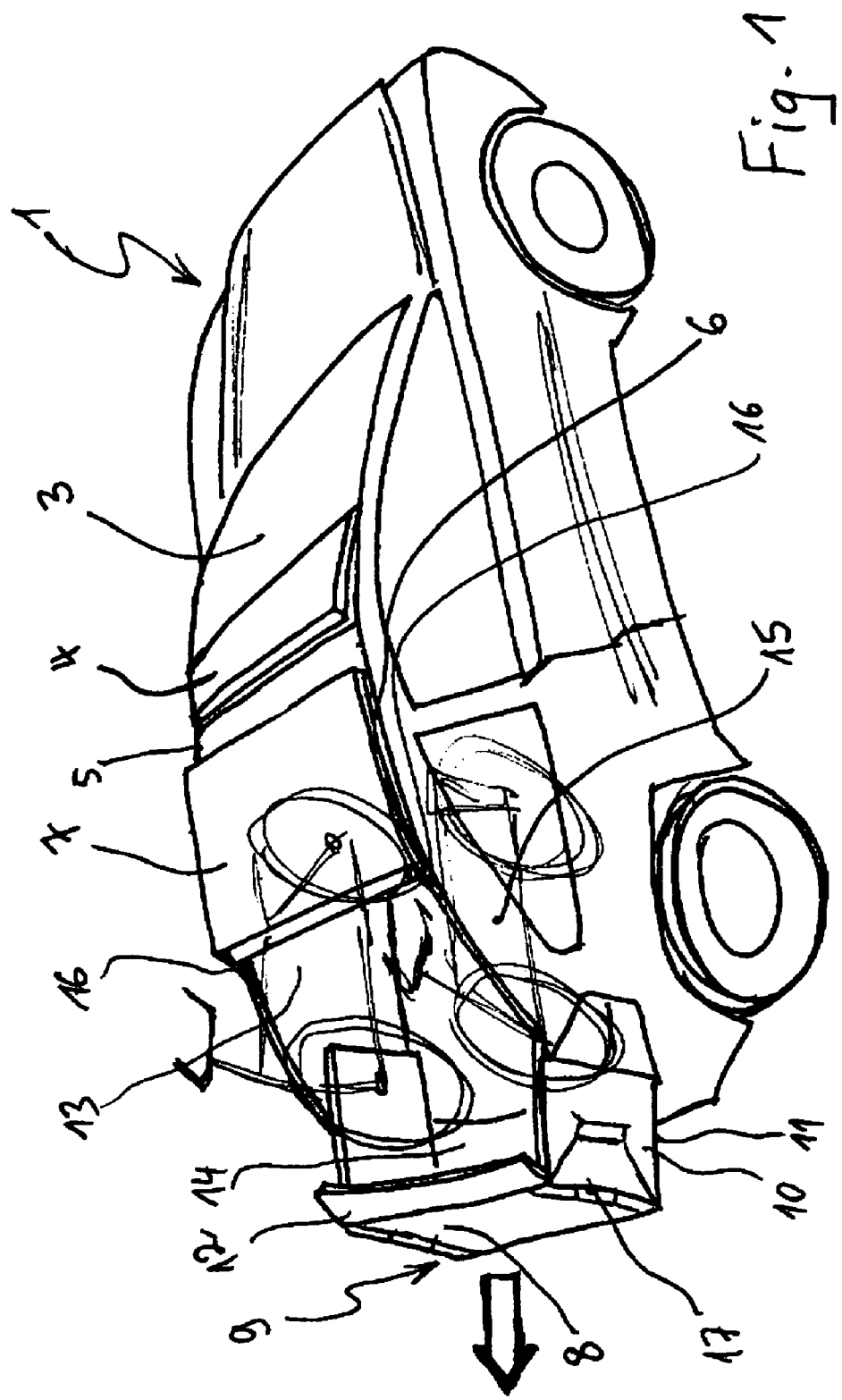
FIG. 1 shows a schematic perspective view of a vehicle in accordance with one embodiment of the present invention with its rear window opened, and its cargo space extension extended.

FIG. 1 schematically shows a motor vehicle 1 with a vehicle roof 2 which, from the front window 3, includes a wind deflector louver 4 pivotally supported near its front edge, a movable cover 5, and a fixed roof part 6 thereafter. The motor vehicle rear includes a rear window 7, the operation of which is most clearly shown in the embodiments of FIGS. 5 and 6 described herein in conjunction with FIG. 1. The lower edge of the rear window 7 can be raised to the rear a small distance as shown by the arrow A, the rear window being coupled to a pivoting lever 16, and moved up over the fixed roof part 6 by following guides (not shown) provided on the inside of the C pillars 15 as shown by the arrow B. Simultaneous with the raising of the lower edge, the top edge of the rear window 7 is also raised on a support lever (not shown) or a corresponding guide enough distance so that the rear window 7 can be moved into the open position shown in FIG. 1. In doing so, a first cargo space opening 13 is cleared in the upper part of the motor vehicle rear which enables loading of smaller baggage items. When the rear window 7 has been moved up as shown in FIG. 1, its front edge is preferably protected against the airflow by the raised position of the wind deflector louver 4.

In addition, if larger pieces of baggage are to be transported, a rear hatch 8 is opened which is located below the rear window 7 and which can be folded down. The rear hatch 8 can also be replaced by one or two rear doors which are laterally attached with hinges in other implementations. The rear hatch 8 (or the rear door) is a component of a cargo space extension 9 which, in addition to the rear hatch 8, also includes a bottom 11 that can be guided to slide above the vehicle bottom 18 and the side walls 10. The entire cargo space extension 9 of the illustrated embodiment can be extended like a drawer out the vehicle 1 toward the rear, and in this way, enlarges the available cargo space of the vehicle. Upon opening, the cargo space extension 9, in addition with its open top, clears the second cargo space opening 14. When provided in conjunction with the first cargo space opening 13 which has been cleared by the rear window 7, a large cargo space opening is provided which enables loading of bulky items. FIG. 1, for example, shows two bicycles which can be easily housed in the cargo space for the example vehicle 1 shown. If necessary, the cargo space extension 9 can be moved again into the partially, or entirely retracted state, after loading of the articles if the size and composition of the loaded articles allow.

Figure 3:
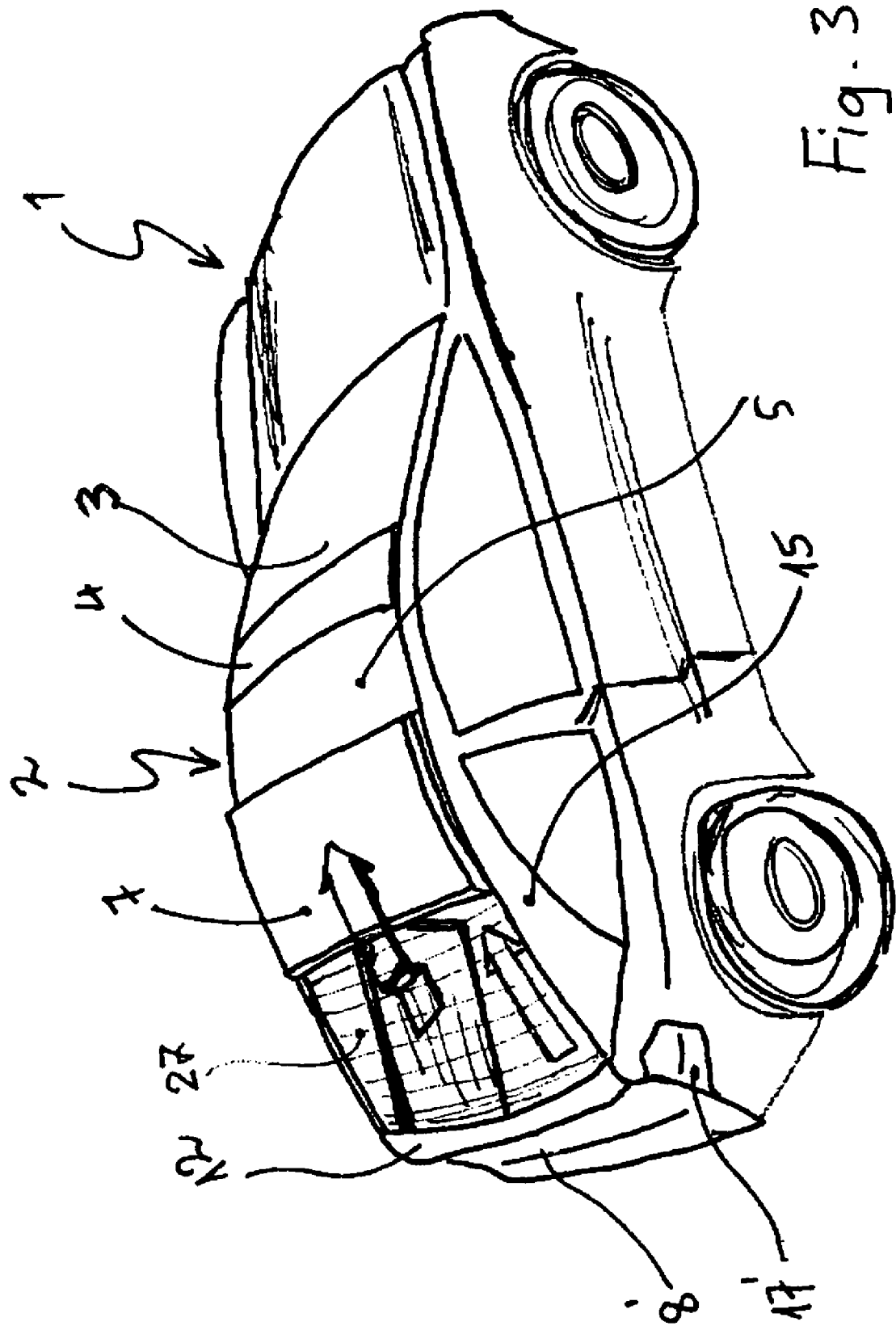
FIG. 3 shows the vehicle of FIG. 1 with the cargo space extension retracted, and the rear window opened.
Figure 4:
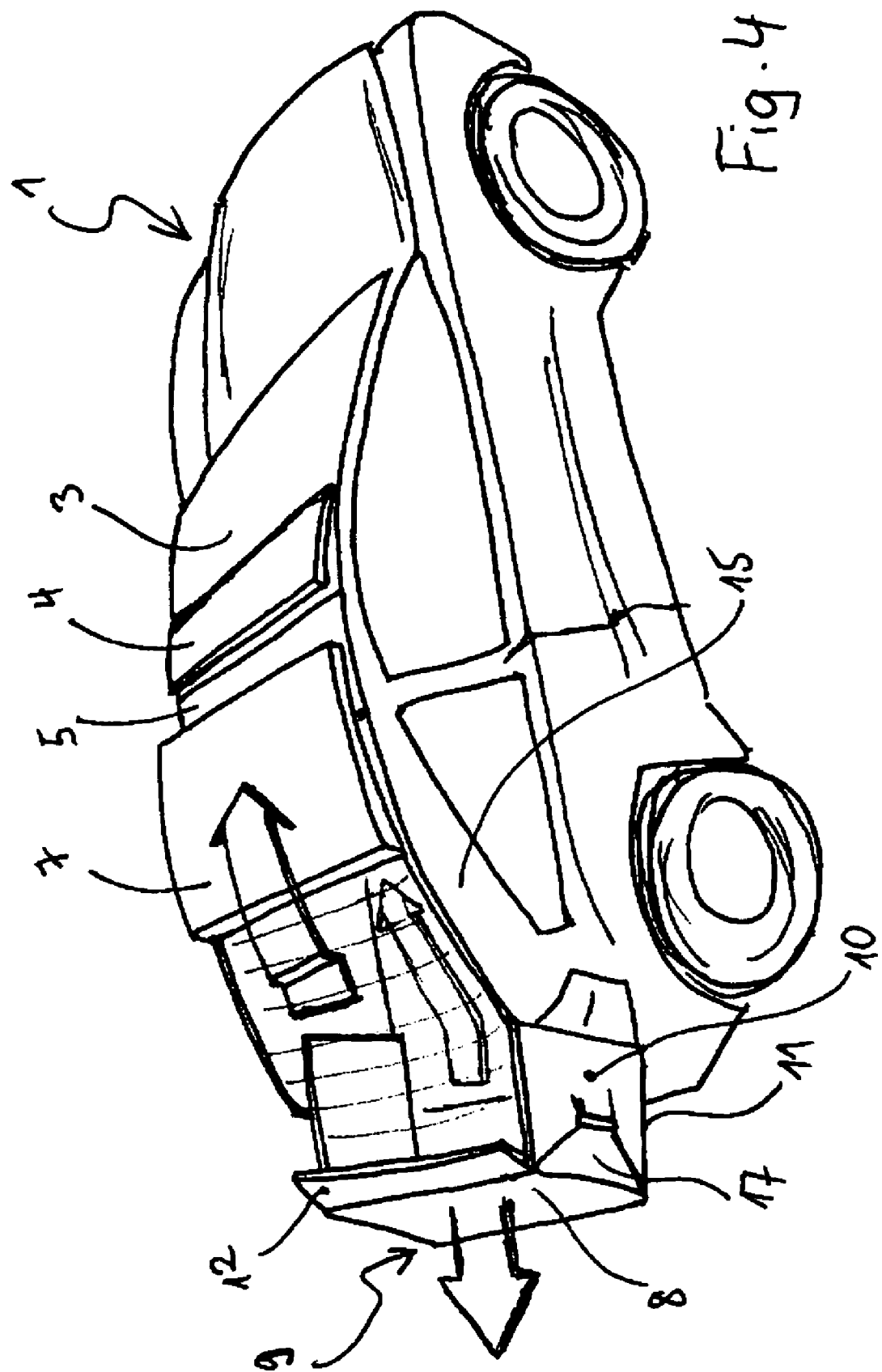
FIG. 4 shows the vehicle of FIG. 1 with an additionally illustrated shade for closing the cargo space openings which have been cleared by the rear window and the cargo space extension.

FIG. 3 shows the vehicle 1 with the cargo space extension 9 retracted, and the rear window 7 opened, while FIG. 4 shows the vehicle 1 with the cargo space extension 9 extended and the rear window 7 opened. As most clearly shown in FIG. 5, a bumper 19 may be provided at the height of the vehicle bottom 18 underneath the rear hatch 8. Alternatively, the bumper 19 can also be located in the lower area of the rear hatch 8 in other implementations.

Figure 5:
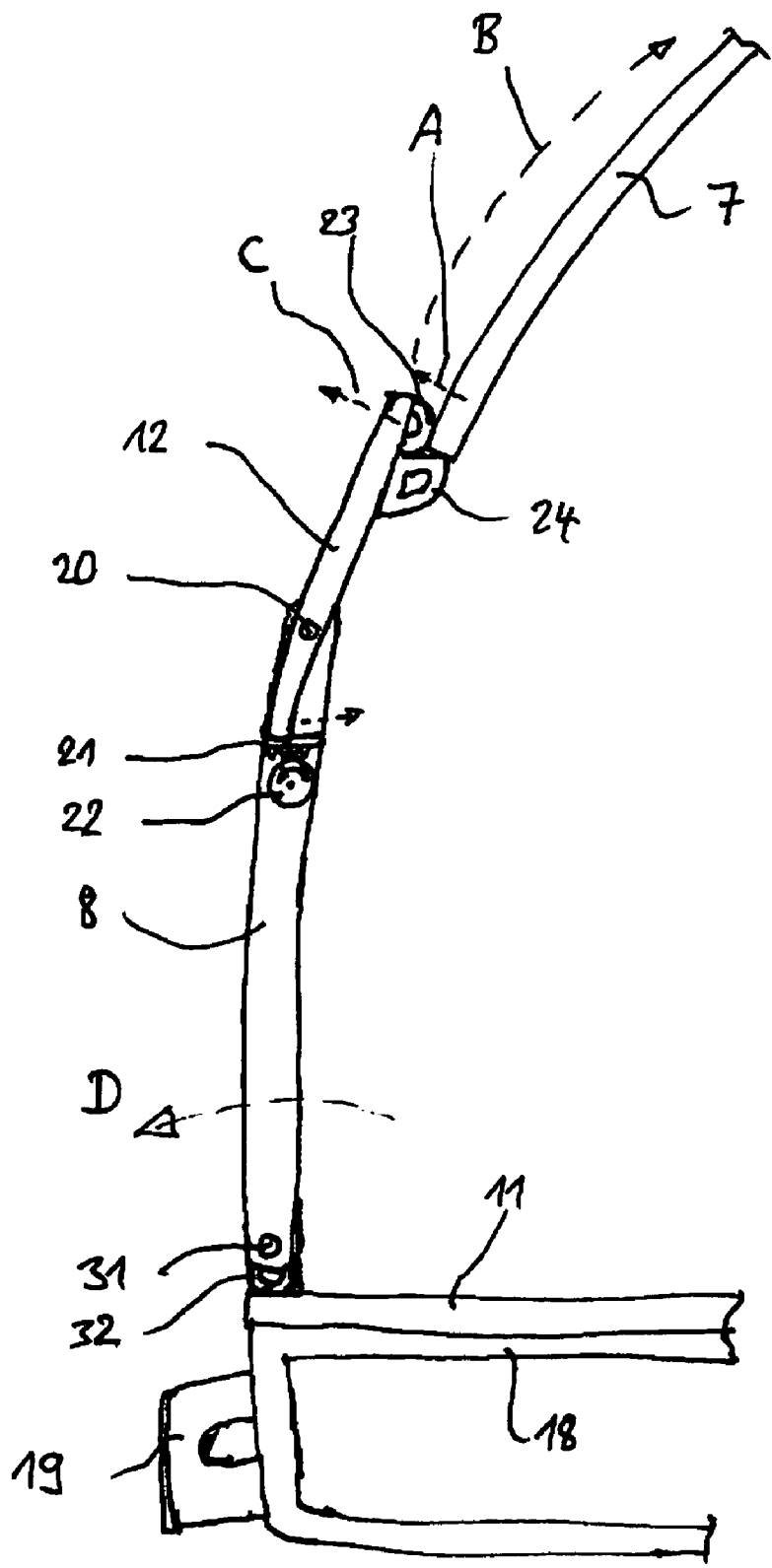
FIG. 5 shows a schematic, lengthwise cross-sectional view of the vehicle rear with the drive for operation of the rear part in accordance with one implementation.

On the top edge of the rear hatch 8, the rear part 12 is supported to allow it to pivot around the pivoting axis 20. The rear part 12 in the closed position, covers the transition area between the rear hatch 8 and the rear window 7. To allow raising motion of the lower edge of the rear window 7, the top edge of the rear part 12 is pivoted counterclockwise to the rear by a small distance around the pivoting axis 20, so that space is formed for the pivoting motion of the rear window 7. As shown in FIG. 5, the rear part 12 is in its closed position with two seals 23 and 24 located near its top edge that adjoin the bottom edge of the rear window 7, thereby forming a seal from the outside and underneath.

Figure 6:
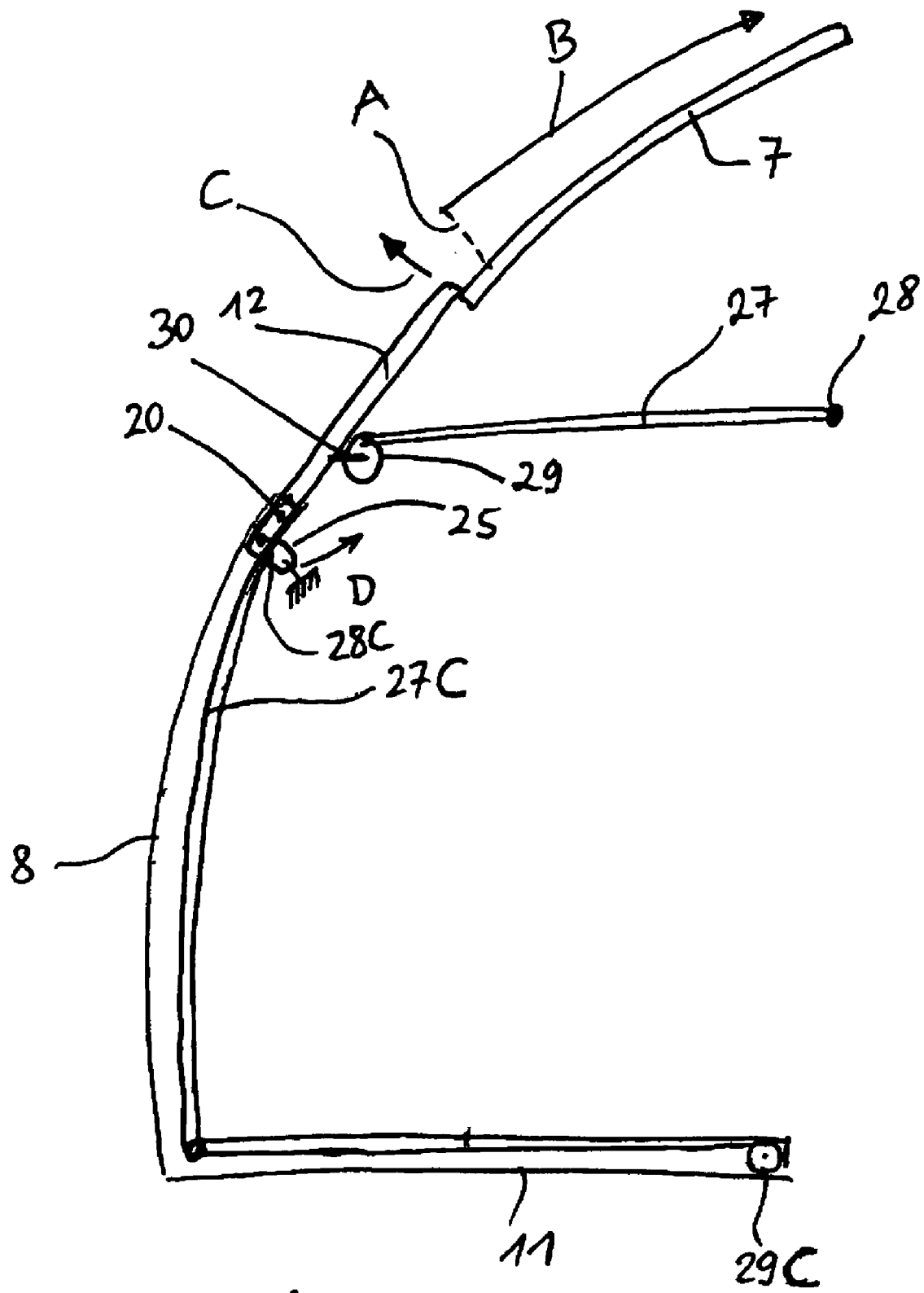
FIG. 6 shows a schematic, lengthwise cross-sectional view through the vehicle rear in the area of the side lock with a first embodiment of a cargo space cover.

The inner side of the rear part 12, as most clearly shown in FIG. 6, is furthermore provided with locking hooks 25 on either side, the locking hooks 25 engaging the holding devices (not shown) when the rear part 12 is in the closed position. In the first pivoting motion of the rear part 12, to allow the raising motion of the rear window 7, the locking hooks 25 remain engaged to the holding devices. According to the embodiment shown in FIG. 5, the rear hatch 8 can be additionally pivoted around a pivoting axis 31 located in the lower part of the rear hatch 8 in the direction shown by arrow D, and positioned into the horizontal position. In doing so, the second cargo space opening 14 is cleared without the cargo space extension 9 having to be extended to the rear. On the bottom edge of the rear hatch 8, a seal 32 is provided in the illustrated embodiment. Before pivoting the rear hatch 8, or before extending the cargo space extension 9, the locking hooks 25 are disengaged from the holding devices by further pivoting of the rear part 12 counterclockwise in the direction shown by arrow C. Additionally, the rear part can be used at the same time as an actuating and/or locking element for the rear hatch.

As shown in FIG. 5, the pivoting motion of the rear part 12 is implemented, for example, by a drive 22 in the illustrated embodiment. The drive 22 shown may be located within the rear hatch 8 and is provided with a gear which engages a rack 21 that is curved according to the pivoting path of the bottom edge of the rear part 12.

As is shown in FIG. 6, on the inside of the rear part 12, holding device 30 is provided on which a take-up roller 29 of a cargo space cover is supported, the cargo space cover in this example being implemented as a shade 27. The front edge of the shade 27 is provided with a bow 28 by which it is unwound from the take-up roller 29, and by which the shade 27 is attached to corresponding holding devices on, for example, the back of the backrest of the rear bench seat, or laterally in the area of the rear wheel guard. The shade 27 can be actuated manually or by means of a drive (not shown) which may be located in the area of the take-up roller. The bow 28, in the illustrated embodiment, is laterally guided in the cargo space with a laterally arranged sliding element on guides (not shown).

Figure 2:
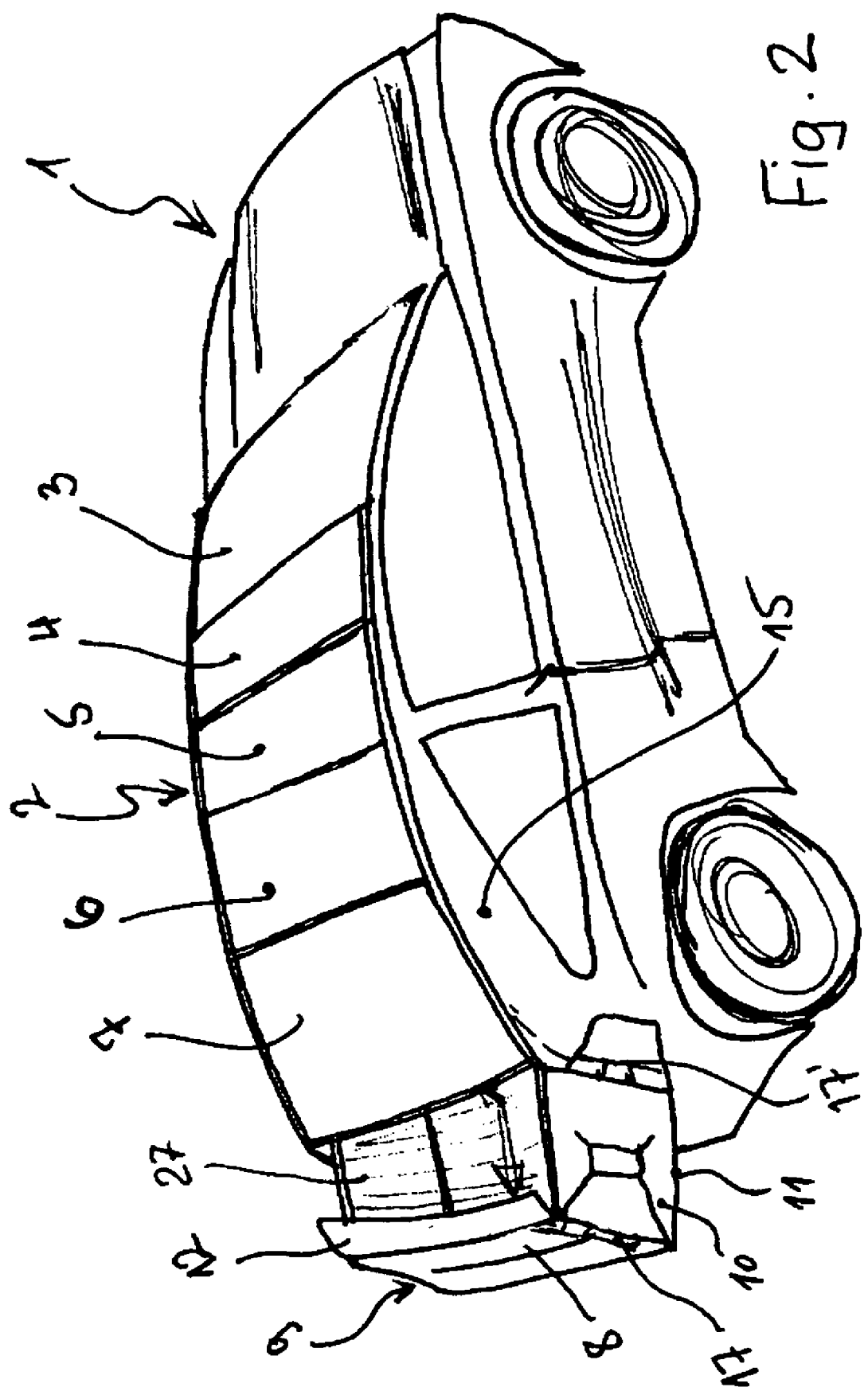
FIG. 2 shows the vehicle of FIG. 1 with the cargo space extension extended, and the rear window closed.
Figure 8:
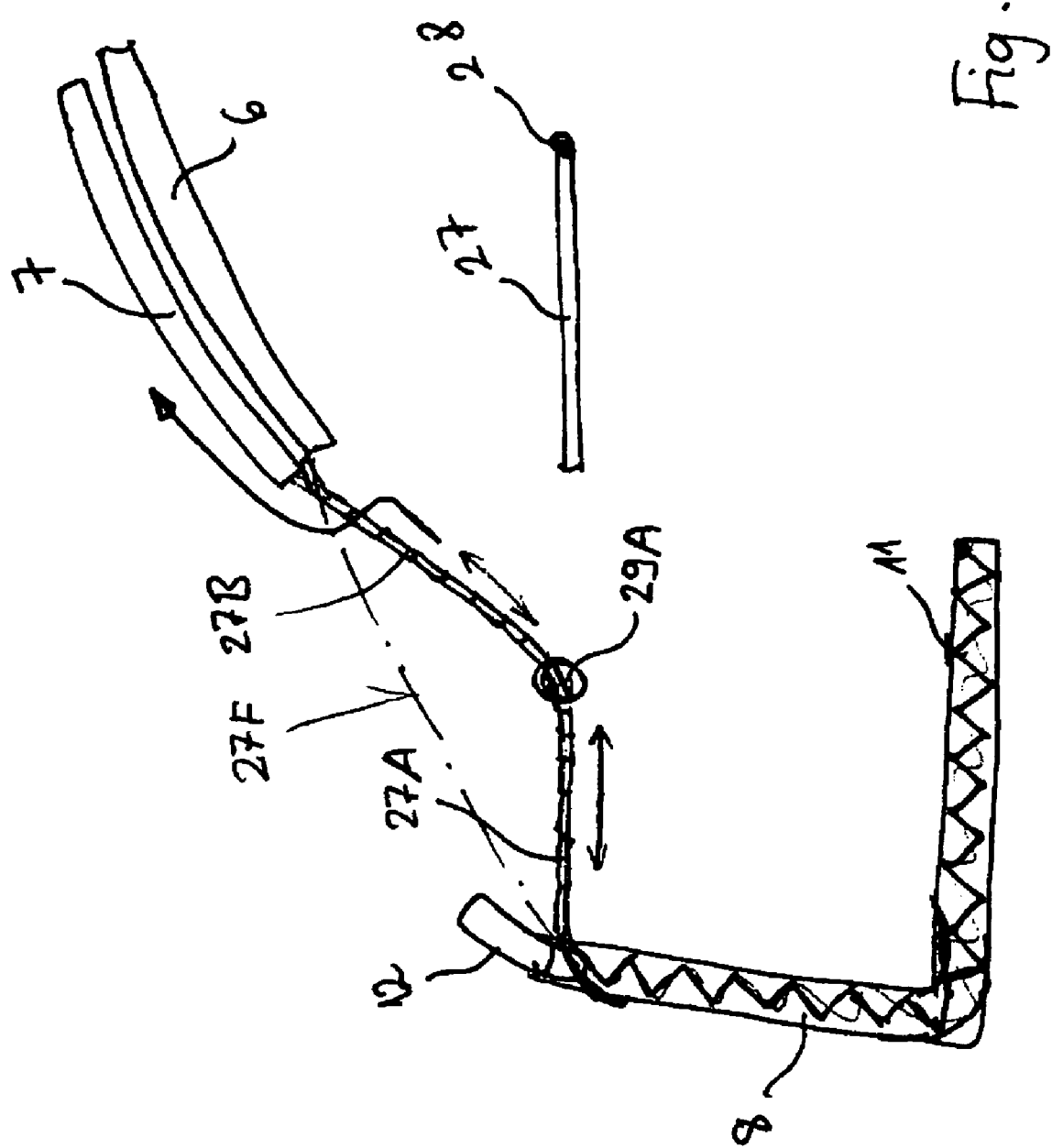
FIG. 8 shows a schematic, lengthwise cross-sectional view through the vehicle rear with the cargo space extension extended, the rear window opened, and a third embodiment of a cargo space cover.
Figure 9:
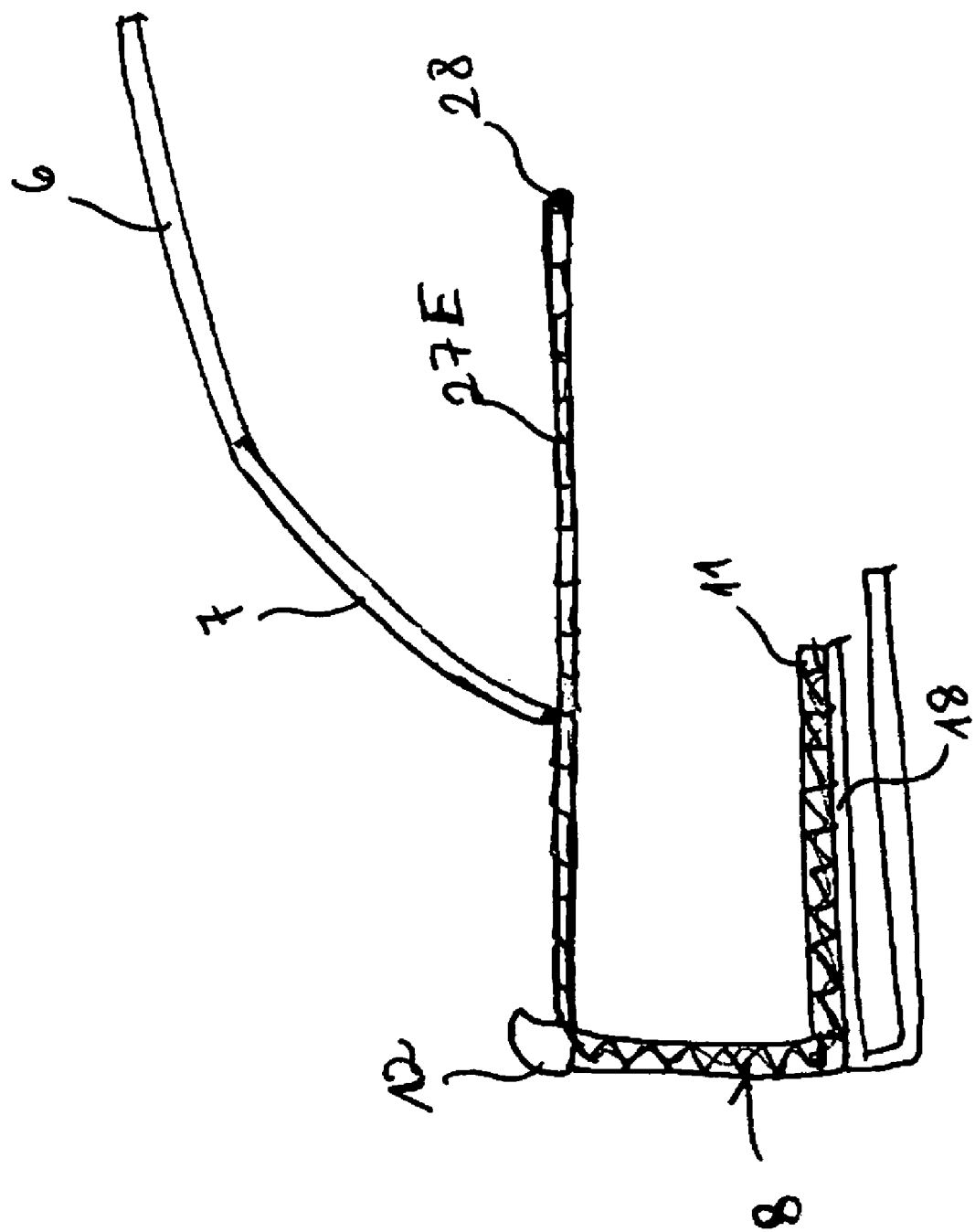
FIG. 9 shows a schematic, lengthwise cross-sectional view through the vehicle rear with the cargo space extension extended, the rear window closed, and yet another embodiment of a cargo space cover.

As FIG. 2 shows, on either side of the rear hatch 8, there can be tail lights 17 which constitute either the normal tail lights of the vehicle 1, or are provided in addition to tail lights 17' which are located on the rear fender of the vehicle 1. The vehicle 1 is illuminated as prescribed by law by the tail lights 17, even with the cargo space extension 9 extended. The cargo space extension 9 can also be opened independently of the rear window 7. In this case, the extended cargo space is accessible for loading, for example, long flat parts via the second cargo space opening 14. The cargo space extension 9 can, if necessary, be covered to the top by the extended shade 27 which, as shown in FIGS. 8 and 9, may be in the form of stiff louvers 27A, 27B and 27E.

The pivoting motion of the rear part 12 by the drive 22 is coordinated with the motion of the rear window 7, and the motion of the cargo space extension 9, by a control device (not shown), so that in an operating process to open the rear window 7, a corresponding pivoting motion of the rear part 12 takes place beforehand to allow clearing of the rear edge of the rear window 7. Likewise, in an operating process to extend the cargo space extension 9, the pivoting motion of the rear part 12 is initiated so that the locking hooks 25 are disengaged beforehand from the holding device. Likewise, in a closing process of the rear window 7 or the cargo space extension 9, a corresponding pivoting movement of the rear part 12 takes place in order to enable the closing. According to one simple embodiment, the rear part 12 is made as a handle part, and after unlocking a lock and/or a handle, the rear part 12 can be manually pivoted.

Various implementations are possible to cover the first cargo space opening 13 cleared by the rear window 7 which has been moved up, as well as the second cargo space opening 14 cleared by extending the cargo space extension 9. As shown in FIG. 6, within the bottom 11 of the cargo space extension 9 and the rear hatch 8, a shade 27C can be guided. The shade 27C can be guided by a take-up roller 29C in the front area of the bottom 11 through the deflection at the connecting site between the bottom 11 and the rear hatch 8, to the top end of the rear hatch 8. The shade 27C emerges to the top of the rear hatch 8 through a slot, and can be pulled out via a bow 28C which is located outside the slot, either horizontally into the position roughly corresponding to the location of the shade 27, or into a pull-out position which runs obliquely up to roughly corresponds to the location of the rear window 7.

Figure 7:
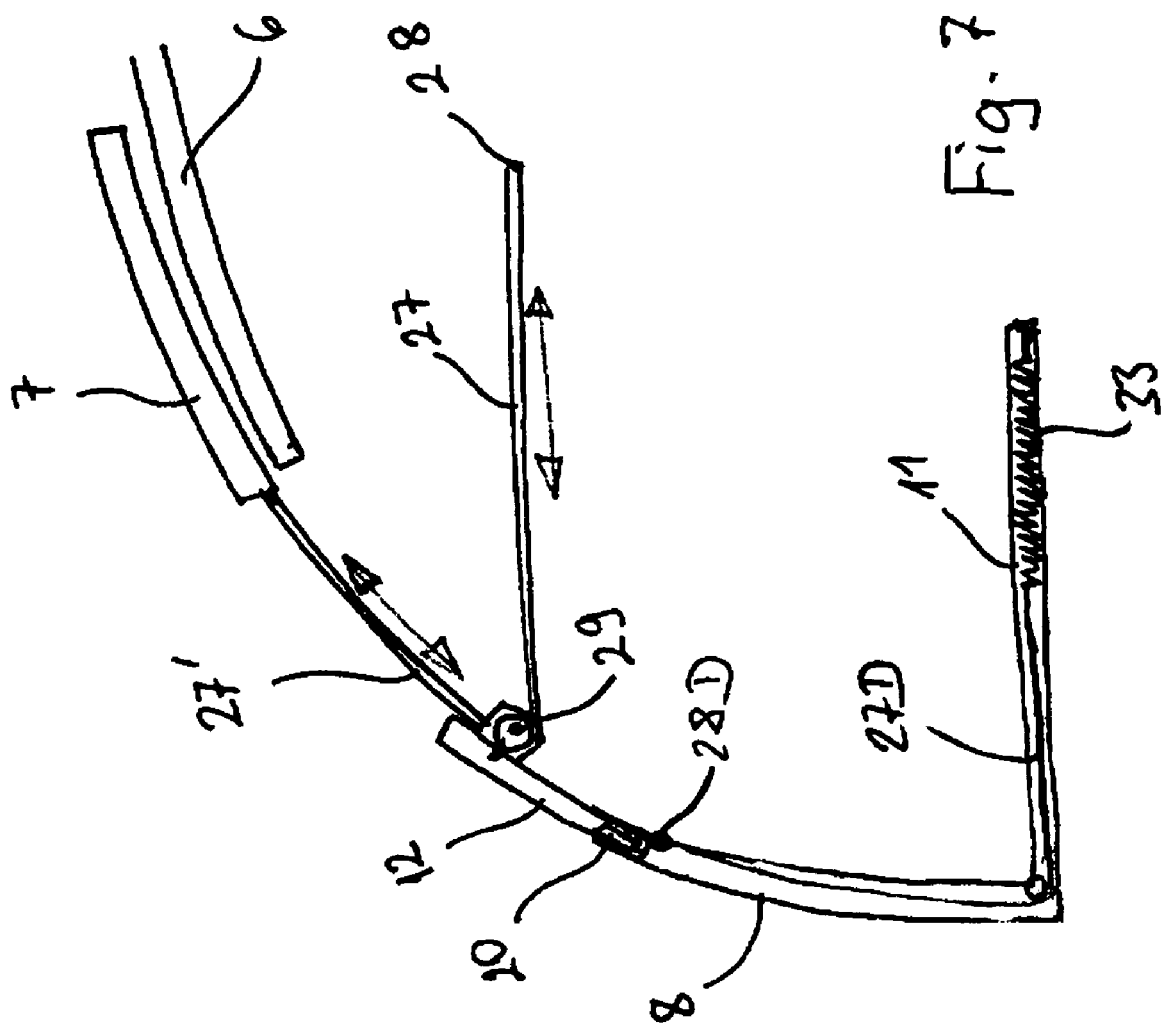
FIG. 7 shows a schematic, lengthwise cross-sectional view through the vehicle rear with a second embodiment of a cargo space cover.

In a similar manner, a shade 27D shown in FIG. 7 is guided within the bottom 11 and the rear hatch 8, and can be pulled out via a bow 28D on the top edge of the rear hatch 8 in the same manner as shade 27C discussed above relative to FIG. 6. However, in contrast to FIG. 6, the lower end of the shade 27D is attached to the bottom 11 by a spring 33, and thus, can be pulled out against the force of this spring 33. FIG. 7 shows another embodiment for a shade 27 which is located on the rear part 12. The take-up roller 29 is supported to be able to pivot on the rear part 12, and the shade can thus be pulled out selectively into the horizontal position labeled 27, or into the position which runs obliquely up and which is labeled 27'. With the rear window 7 closed and the cargo space extension 9 not extended, the shade 27 is optionally used as a cargo space cover in order to hide the cargo and to prevent the cargo from being thrown out of the cargo space in an accident.

Instead of a shade, the cover device for the first cargo space opening 13 and/or the second cargo space opening 14 can also be formed by a louvered cover 27A and 27B as shown in FIG. 8. The louvered cover 27A and 27B can be wound, either like the shade 27 onto the take-up roller 29A, or can be housed in a stowage space in the rear hatch 8. The louvered cover 27A and 27B can alternatively be in the state which has been folded together in a zigzag shape when not in use or only partially in use, and stored at the bottom 11. In this embodiment where louvered covers are used, different implementations for closing the cargo space openings 13 and 14 may be provided. As shown in FIG. 8, the cover with the cargo space extension 9 extended can be guided, proceeding from the top edge of the rear hatch 8, rising first horizontally, and then obliquely up so that it follows roughly the contour of the opened rear window 7 in the second part. With the rear window 7 closed as shown in FIG. 9, the cover 27E can also be guided completely horizontally into the cargo space so that the lower edge of the rear window 7 with a seal rests on the cover 27E.

According to another embodiment which is indicated in FIG. 8 by the dash line, the cover 27F with the cargo space extension 9 extended can also be guided in a continuous flowing line from the top edge of the rear hatch 8, to the rear edge of the roof part 6.

As can be appreciated from the above, the cargo space of a vehicle such as a fastback sedan can be used for diverse purposes when the present invention is implemented, so that for the relatively few cases in which bulky goods are to be transported with a passenger car, procurement of a station wagon is unnecessary.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. An openable motor vehicle rear comprising:
   a rear window movable to clear a first cargo space opening of a cargo space;
   a rear hatch located beneath the rear window, the rear hatch being movable to the rear from a closed position to beyond the contour of the vehicle to clear a second cargo space opening of the cargo space; and
   a rear part positioned between the rear window and the rear hatch to cover the transition between the rear window and the rear hatch;
   wherein the rear part at least one of actuates opening of the rear hatch and locks the rear hatch.

2. The motor vehicle rear as claimed in claim 1, wherein the rear part is movable.

3. The motor vehicle rear as claimed in claim 2, wherein the rear part is adapted to be pivoted.

4. The motor vehicle rear as claimed in claim 1, wherein the rear part is supported on the rear hatch.

5. The motor vehicle rear as claimed in claim 1, wherein the rear part covers the rear edge of the rear window in a closed position.

6. The motor vehicle rear as claimed in claim 1, wherein the rear window is upwardly movable over a roof part.

7. The motor vehicle rear as claimed in claim 1, further comprising a cargo space extension that is rearwardly movable out of the cargo space, the rear hatch being a component of the cargo space extension.

8. The motor vehicle rear as claimed in claim 1, further comprising a motor that actuates the rear part.

9. An openable motor vehicle rear, comprising:
   a rear window movable to clear a first cargo space opening of a cargo space;
   a rear hatch located beneath the rear window, the rear hatch being movable to the rear from a closed position to beyond the contour of the vehicle to clear a second cargo space opening of the cargo space; and
   a rear part movably mounted on the rear hatch between the rear window and the rear hatch to cover the transition between the rear window and the rear hatch;
   further comprising a motor that actuates the rear part to move away from a rear edge of the rear window.

10. The motor vehicle rear as claimed in claim 1, wherein at least one of the rear part and the rear hatch accommodates a cargo space cover.

11. The motor vehicle rear as claimed in claim 10, wherein the cargo space cover includes a retractable shade.

12. The motor vehicle rear as claimed in claim 10, wherein the cargo space cover includes a louvered cover.

13. An openable motor vehicle rear, comprising:
    a rear window movable to clear a first cargo space opening of a cargo space;
    a rear hatch located beneath the rear window, the rear hatch being movable to the rear from a closed position to beyond the contour of the vehicle to clear a second cargo space opening of the cargo space; and
    a rear part positioned between the rear window and the rear hatch to cover the transition between the rear window and the rear hatch;
    wherein the rear part is adapted to be pivoted; and
    wherein the rear part is pivoted to release a lower edge of the rear window to allow movement of the rear window.

14. The motor vehicle rear as claimed in claim 11, wherein the retractable shade is mounted so as to extend within the bottom of the cargo space extension.

15. An openable motor vehicle rear, comprising:
    a rear window movable to clear a first cargo space opening of a cargo space;
    a rear hatch located beneath the rear window, the rear hatch being movable to the rear from a closed position to beyond the contour of the vehicle to clear a second cargo space opening of the cargo space; and
    a rear part positioned between the rear window and the rear hatch to cover the transition between the rear window and the rear hatch;
    wherein at least one of the rear part and the rear hatch accommodates a cargo space cover which includes a retractable shade;
    wherein the retractable shade is mounted so as to extend within the bottom of the cargo space extension and
    wherein the retractable shade is mounted on a take-up roller in a front area of the bottom of the cargo space extension and is guided around deflection points at a connecting site between the bottom of the cargo space extension and the rear hatch and at a top area of the rear hatch to a pull-out mechanism.

16. The motor vehicle rear as claimed in claim 14, wherein the retractable shade is connected to a spring extending within the bottom of the cargo space extension and is guided around deflection points at a connecting site between the bottom of the cargo space extension and the rear hatch and at a top area of the rear hatch to a pull-out mechanism.

17. The motor vehicle rear as claimed in claim 14, wherein the retractable shade is mounted on a take-up roller on said rear part and is connectable to a pull-out mechanism for extending the retractable shade across the cargo space with the rear window closed, and is pivotable for connection to the rear window for upward extension upon raising of the rear window.

* * * * *